US009165090B2

(12) United States Patent
Broodney et al.

(10) Patent No.: US 9,165,090 B2
(45) Date of Patent: Oct. 20, 2015

(54) CONCISE MODELING AND ARCHITECTURE OPTIMIZATION

(71) Applicant: International Business Machines Corporation, Armonk, NY (US)

(72) Inventors: Henry Broodney, Haifa (IL); Dolev Dotan, Oshrat (IL); Lev Greenberg, Haifa (IL); Michael Masin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/631,996

(22) Filed: Sep. 30, 2012

(65) Prior Publication Data

US 2014/0095118 A1 Apr. 3, 2014

(51) Int. Cl.
*G06F 17/50* (2006.01)

(52) U.S. Cl.
CPC ............ *G06F 17/50* (2013.01); *G06F 17/5009* (2013.01); *G06F 17/5086* (2013.01); *G06F 17/5095* (2013.01)

(58) Field of Classification Search
CPC ............ G06F 8/10; G06F 8/71; G06F 17/50; G06F 17/5009; G06F 17/5086; G06F 17/5095; G06F 17/11; G06F 2217/02; G06F 2217/06; G06F 2217/08; G06F 2217/12
See application file for complete search history.

(56) References Cited

U.S. PATENT DOCUMENTS

| | | | | |
|---|---|---|---|---|
| 6,305,006 | B1* | 10/2001 | Markov | 716/102 |
| 8,209,657 | B1* | 6/2012 | Sawyer et al. | 717/100 |
| 2006/0287899 | A1* | 12/2006 | Balmelli et al. | 705/7 |
| 2007/0180424 | A1 | 8/2007 | Kazakov et al. | |
| 2007/0277151 | A1* | 11/2007 | Brunel et al. | 717/113 |
| 2009/0172632 | A1* | 7/2009 | Kashai et al. | 717/104 |
| 2009/0235227 | A1 | 9/2009 | Hartman et al. | |
| 2012/0158386 | A1* | 6/2012 | Ehben et al. | 703/6 |

OTHER PUBLICATIONS

Albarello et al, "A Formal Design Synthesis and Optimization Method for Systems Architectures", 9th International Conference on Modeling, Optimization & SIMulation, Jun. 6-8, 2012.*
Ziadi et al, "Towards a UML Profile for Software Product Lines", F. van der Linden (Ed.): PFE 2003, LNCS 3014, pp. 129-139, 2004.*
Masin et al, "META II: LINGUA FRANCA Design and Integration Language", IBM Research-Haifa Research Laboratory, Aug. 2011 Final report, Clearance date Nov. 8, 2011.*
Belategi et al, "Variability Management in Embedded Product Line Analysis", 2010 Second International Conference on Advances in System Testing and Validation Lifecycle, IEEE, 2010.*
Kerzhner et al, "A SYSML-Based Language for Modeling System-Level Architecture Selection Decisions", Proceedings of the ASME 2012 International Design Engineering Technical Conferences & Computers and Information in Engineering Conference, Aug. 12-15, 2012.*

(Continued)

Primary Examiner — Mary C Jacob

(57) ABSTRACT

A method for concise modeling including receiving a first model mapping a plurality of prototype connections between a plurality of prototype objects, receiving at least one dataset having a plurality of optional objects, each object matching one of the prototype objects, and automatically constructing a second model having at least one of the optional objects mapped according to the first model.

25 Claims, 6 Drawing Sheets

(56) References Cited

OTHER PUBLICATIONS

Matthias Clauss, "Generic Modeling using UML Extensions for Variability", Institute of Software Integrated Systems, Workshop on Domain Specific Visual Languages at Object-Oriented Programming, Systems, Languages & Applications 2001, Tampa Bay, USA, Sep. 14, 2001.

Robak et al., "Extending the UML for Modeling Variability for System Families", International Journal of Applied Mathematics and Computer Science, vol. 12, Issue 2, pp. 285-298, 2002.

IBM, "Help Rational Rhapsody 7.6 Releases", IBM—Downloaded on Oct. 23, 2012. URL:http://publib.boulder.ibm.com/infocenter/rhaphlp/v7r6/index.jsp.

Phoenix Integration, "PHX ModelCenter—Desktop Trade Studies", Phoenix Integration Model Center website, Downloaded on Oct. 23, 2012. URL: http://www.phoenix-int.com/software/phx-modelcenter.php.

Saxena and Karsai, "The GDSE Framework: A Meta-Tool for Automated Design Space Exploration", Proceeding DSM '10 Proceedings of the 10th Workshop on Domain-Specific Modeling, Article No. 15, 2010.

Pohl et al., "Software Product Line Engineering : Foundations, Principles, and Techniques", Springer, 2005.

University of Waterloo, "Clafer", Generative Software Development Lab, Department of Electrical and Computer Engineering, Downloaded on Oct. 24, 2012. URL: http://gsd.uwaterloo.ca/clafer.

Broodney et al., "Generic Approach for Architecture Optimization in MBSE", In preparation for Proceedings of the Annual International Symposium of INCOSE, 2012.

\* cited by examiner

CONCISE MODELING AND ARCHITECTURE OPTIMIZATION

BACKGROUND

The present invention, in some embodiments thereof relates to methods and systems for concise modeling and architecture optimization and, more specifically, but not exclusively, to methods and systems for compact modeling of systems as a combination of system modeling languages and datasets which support variability modeling and design optimization.

A modeling language is any artificial language that can be used to express information, knowledge or systems in a structure that is defined by a consistent set of rules. The rules are used for interpretation of the meaning of components in the structure. Modeling languages are in wide use in the field of object-oriented software engineering, and recently in Systems Engineering. For example, unified modeling language (UML) is a standardized general-purpose modeling language. The UML standard is managed, and was created, by the Object Management Group.

In recent years, the practice of model-driven software and systems engineering gained substantial traction. In particular, several object-oriented modeling languages, such as UML and Modelica, are becoming wide-spread. Particular domains and platforms require adjustments of such model driven languages. Such an adjustment is, for example, a profile in UML. A profile in UML provides a generic extension mechanism for customizing UML models for particular domains and platforms. Extension mechanisms allow refining standard semantics in strictly additive manner, so that they can't contradict standard semantic. Profiles are defined using stereotypes, tag definitions, and constraints that are applied to specific model elements, such as Classes, Attributes, Operations, and Activities. A Profile is a collection of such extensions that collectively customize UML for a particular domain (e.g., aerospace, healthcare, financial) or platform (J2EE, NET). One example of a UML profile is the Systems Modeling Languages (SysML). SysML is an extension of a subset of UML which uses UML's profile mechanism. It supports the specification, analysis, design, verification and validation of a broad range of systems and systems-of-systems.

Model-Based Systems Engineering (MBSE) is a methodology for developing and analyzing systems using graphical representations of the underlying functions, requirements, architecture, relationships and interfaces that define the system. The MBSE approach helps to improve understanding and communication of complex system and system-of-systems designs. MBSE aims to overcome the limitations of the conventional document-based approach by leveraging computing tools to structure, share and automatically analyze design information. The ultimate purpose is to ensure specification completeness and consistency, traceability of requirements and design choices, reuse of design patterns and specifications, and a shared understanding of the designs among users and designers.

The acceptable practice today for modeling architecture alternatives for trade studies is to explicitly model different variants of the system which limit a number of alternative due to high effort required for modeling each of the alternatives. As a result many alternatives are not evaluated which results in sub-optimal design solutions. Some current model design methods, such as SysML parametric diagram along with IBM Rhapsody Parametric Constraint Evaluator (PCE), enable to model design alternatives, but are limited to variability of system primitive attributes, i.e. only attributes of primitive types can differ between design alternatives. Another related approach is a variation points modeling in product line engineering (PLE). Currently this technique is used to define PLE system variants, but the same technique could be used to define design alternatives.

SUMMARY

According to an aspect of some embodiments of the present invention there is provided a method for concise modeling comprising: receiving a first model mapping a plurality of prototype connections between a plurality of prototype objects; receiving at least one dataset having a plurality of optional objects each the object matching one of the plurality of prototype objects; and automatically constructing a second model having at least one of the plurality of optional objects mapped according to the first model.

Optionally, the at least one dataset is a table and the table is external to the first model. Optionally, the first model and the second model are a systems modeling language (SysML) model. Optionally, the method further comprises generating a graphical representation of the second.

According to an aspect of some embodiments of the present invention there is provided a method for architecture optimization comprising: receiving a model mapping a plurality of prototype connections between a plurality of prototype objects; receiving at least one dataset having a plurality of optional alternative objects each the object matching one of the plurality of prototype objects; and identifying a plurality of optional alternative designs each comprises a set of optional objects from the plurality of optional objects and matches the mapping to the model.

Optionally, the method further comprises defining a plurality of constraints over the model and restricting the plurality of optional alternative designs to comply with the plurality of constraints. Optionally, the method further comprises filtering the optional alternative designs according to at least one of the plurality of constraints. Optionally, the method further comprises receiving at least one dataset having a plurality of optional alternative connections wherein at least one of the plurality of optional alternative connections complies with at least one of the plurality of prototype connections. Optionally, the at least one of the plurality of optional alternative designs further comprises a set of optional alternative connectors from the plurality of optional alternative connectors Optionally, the method further comprises automatically analyzing the plurality of optional alternative designs; and automatically grading the plurality of optional alternative designs. Optionally, the method further comprises: identifying at least one of a plurality of constraints having no optional alternative design which complies with the at least one of a plurality of constraints; adjusting the at least one of a plurality of constraints; and identifying a plurality of optional alternative designs each comprises a set of the optional objects selected from the at least one dataset according to the model; and iteratively repeating the identifying a plurality of optional alternative designs, the identifying at least one of a plurality of constraints and the adjusting the at least one of a plurality of constraints for creating at least one new the optional alternative design for at least one of the plurality of constraints. Optionally, the at least one of the plurality of prototype objects has at least one stereotype and the at least one stereotype points to the at least one dataset having a plurality of optional objects. Optionally, the at least one dataset in the identifying a plurality of optional alternative designs is pointed by the stereotype. Optionally, the stereotype has a stereotype attribute, a stereotype property and a stereotype tag. Optionally, a process for the identifying a plurality of optional alternative designs is selected according to by the stereotype tag and a range the plurality of optional alternative designs is limited by the stereotype attribute and a property of the plurality of optional alternative designs is limited by the stereotype property. Optionally, at least one of the pluralities of prototype objects has a stereotype and a schema is generated according to the stereotype. Optionally, the at least one dataset is a table and the table is external to the model. Optionally, the method further comprises identifying at least one of a plurality of constraints having no optional alternative design which complies with the at least one of a plurality of constraints; and receiving optional alternative design for identified the at least one of a plurality of constraints. Optionally, the constraints define composition rules. 20. The method of claim 5, wherein the model is a systems modeling language (SysML) model. Optionally, the method further comprises back annotation of identified the plurality of optional alternative designs. Optionally, the method further comprises generating a graphical model representing identified the plurality of optional alternative designs. Optionally, the method further comprises defining a plurality of constraints over the plurality of prototype connections; generating a schema corresponding to the plurality of prototype connections; and populating a plurality of tables corresponding to the schema with a plurality of optional alternative connections.

According to an aspect of some embodiments of the present invention there is provided a computer readable medium comprising computer executable instructions adapted to perform the above described methods.

Optionally, the computer readable medium comprising computer executable instructions adapted to perform the above described methods.

According to an aspect of some embodiments of the present invention there is provided a system for concise modeling comprising a model receiving module which receives a model having a plurality of prototype objects; a constraint module which defines a plurality of constraints over the plurality of prototype objects; a dataset receiving module which receives at least one dataset having a plurality of optional objects; and a processor.

Optionally, the system further comprises: an optimization module which identifies a plurality of optional alternative designs each comprises a set of the optional objects selected from the at least one dataset according to the model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
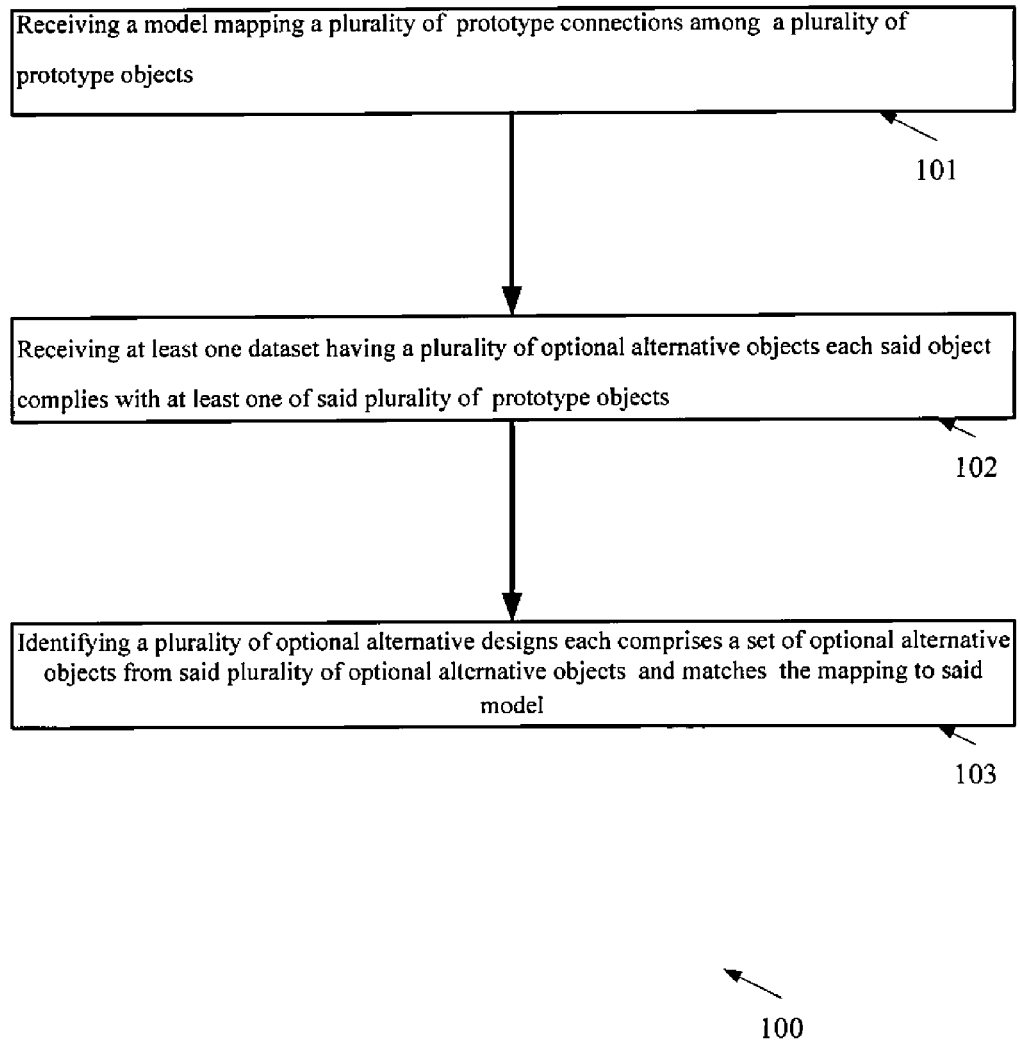
FIG. 1 is an illustration of a method for architecture optimization, according to some embodiments of the present invention.

The present invention, in some embodiments thereof relates to methods and systems for concise modeling and architecture optimization and, more specifically, but not exclusively, to methods and systems for compact modeling of systems as a combination of system modeling languages and datasets which support variation modeling and design optimization.

The concise model is composed of two main parts: a generic model and possible implementations of the entities of that generic model. These implementations are also referred to as optional alternative elements. The generic model is comprised of prototype objects and prototype connectors which are the generic forms of the model entities. As used herein, the term prototype means a modeling element standing for a collection of blocks, parts, connectors, dependencies and/or a combination thereof. A prototype may be replaced in explicit and/or expended model by the entities it stands for, after back annotation. Constraints may be defined over the model entities. The constraints may use model interrogation functions. The actual optional alternative elements correspond to the prototype objects and/or prototype connectors. The generic model is typically modeled in a modeling language, such as SysML. The generic model may be presented in a graphical form. The optional alternative elements are typically provided in a tabular form and/or other dataset forms. The tabular form requires less effort to implement and is less time consuming. In addition, the resulting generic model part is smaller in terms of entities numbers and/or entities relationships and, therefore, is easier to generate, maintain and/or comprehend. The concise model enables automatic exploration of the design space for optimization purposes. Such an optimization may take into account the constraints to reduce the explored design space. Further characteristics of the model elements such as stereotypes, tags, stereotypes properties and/or stereotypes attributes may be used to adjust a model to a specific domain problem. Chosen designs may be explicitly generated in back annotation process. One result of the back annotation process is a graphical presentation of one or more chosen designs without further effort on the part of the modeler.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
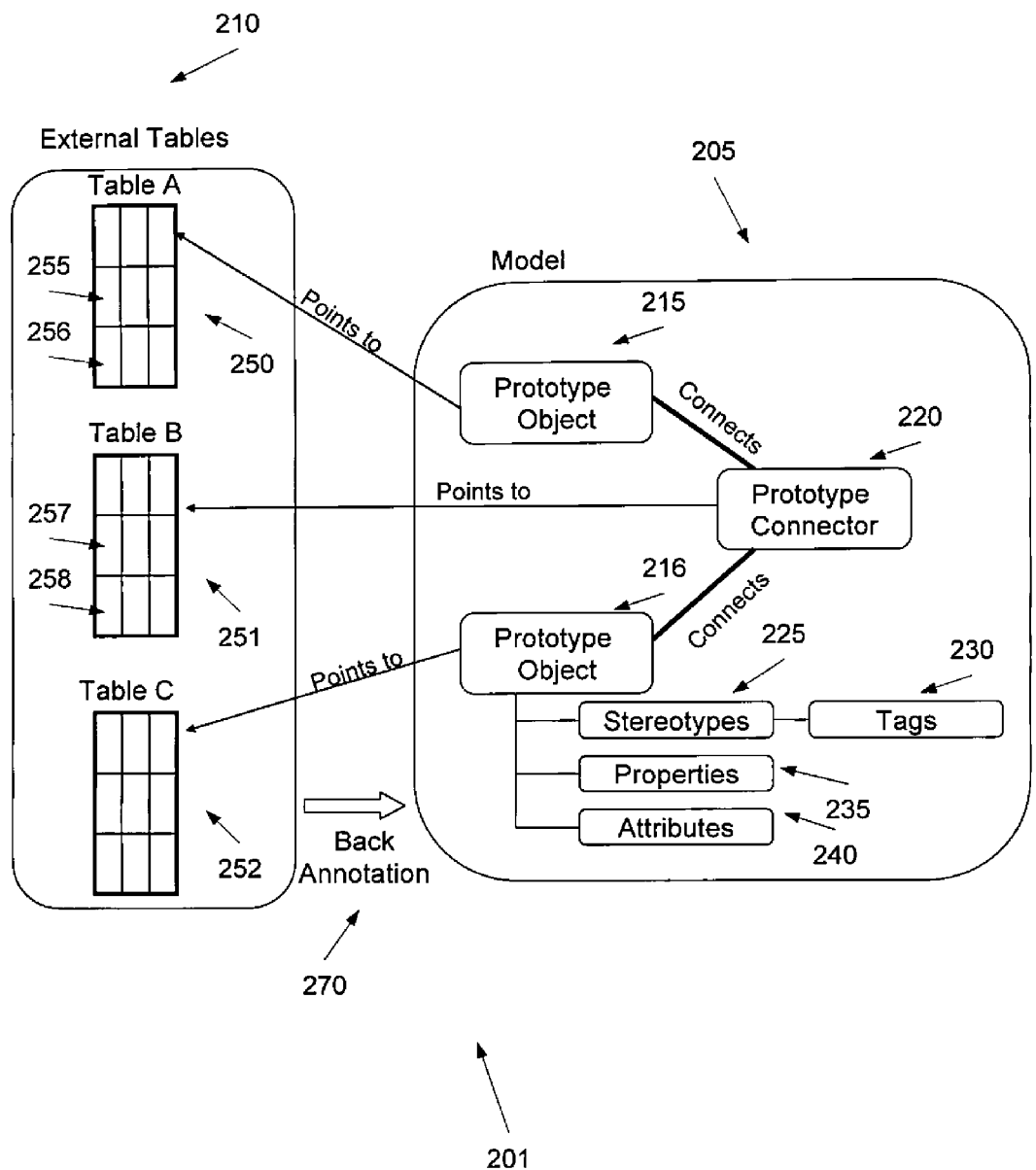
FIG. 2 is an illustration of a mapping of prototype objects to external tables in a concise model, according to some embodiments of the present invention.

Reference is now made to FIG. 1 which illustrates a method 100 for architecture optimization, according to some embodiments of the present invention. This method 100 enables to optimize the choice of alternative objects and/or connectors using a model that is characterized in terms of constraints and/or relations between its entities before the alternative objects and/or connectors are known. The method 100 is comprised of three main stages: receiving a model 101, receiving a dataset 102 and architecture optimization 103. The model 205, illustrated in FIG. 2, is composed of generic entities: a prototype object and a prototype connector. The model 205 maps a plurality of prototype connections 220 among a plurality of prototype objects 215, 216. The model 205 may be a graphical model that illustrates the prototype objects 215, 216, the prototype connectors 220 and/or the relationships between them. First, the model is received by a model receiving module 501. Then, at least one dataset 250, 251, 252 is received by a dataset receiving module 503. The dataset 250 has a plurality of optional objects 255, 256. Each object 255, 256 complies with one or more of a plurality of prototype objects 215, 216. The optional objects 255, 256 may be added manually, taken from similar system(s) and/or a result of another architecture optimization process. The source of the optional object may be indicated. The optional objects 255, 256 may be characterized by attributes. The optional objects 255, 256 may be saved in a tabular format and/or other datasets containers. Each row in such a table may be an optional object or an optional alternative connector. The tables 210 may be external to the model 205. The schema of the table(s) 210 may be created according to the model 205. Then, an optimization module 504 identifies a plurality of optional alternative designs. Each optional alternative design comprises a set of optional objects. The sets of optional objects are selected from the plurality of optional objects.

Each optional alternative design matches the mapping to the model 205. Optionally, constraints having no optional alternative designs which comply with the constraints are identified. A catalog may include a large number of items which does not enable an optimization procedure to scan all possible combinations in a reasonable computing time. Some constraints may be left without alternative designs after an optimization of such a catalog. The constraints without optional alternative designs may be reported, modified, subjected to another type of optimization method, optimized using an alternative catalog, manually provided, imported from an external source and/or subjected to another procedure for resolving them. Optional alternative designs for the identified constraints may be provided. Optionally, the method 100 is implemented in a computer readable medium.

Reference is also made to FIG. 2 that illustrates a mapping of prototype objects 215, 216 to external tables 210 in a concise model 201, according to some embodiments of the present invention. The concise model 201 enables to model a very large system in a compact manner. The concise model 201 has two major parts: a model 205 which includes prototype objects 215, 216 connected by prototype connectors 220, and external tables 210 for storing optional objects 255, 256. The prototypical objects 215, 216 and prototypical connectors 220 may be associated with sets of concrete objects and connectors: optional objects 255, 256 and optional alternative connectors 257, 258. The model 205 may be implemented as extended SysML notations, using a SysML profiling mechanism. SysML extensions are used here to denote variation points and some compositional rules for the system that standard SysML cannot cover. This approach relies on the SysML approach of composing systems using parts and connectors, as defined in Internal Block Diagrams. The prototype objects 215, 216 and prototype connectors 220 may be legal SysML parts. These SysML parts may be interconnected with ports and links, which enable to define composition rules and/or connectivity rules for those prototypes 215, 216, 220. Optionally, the concise model 205 enables to specify design alternatives. The external tables 210 may be of two types: "instance" tables, also called inventory, and "catalog" tables. Optionally, some of the cells in "instance" tables are unfilled. The unfilled cells allow an optimization process to fill them in. The unfilled cells, since they can hold a range of values, may provide the variability aspect to the modeling, i.e. modeling not a specific system, but its composition rules. This allows a concise model to capture more than a specific architecture in a concise form. The model 205 may be graphically represented. Exemplary graphic representation of the model 205 includes SysML, UML, Simulink, Modelica and UPDM. The optional objects 255, 256 for each prototype 215 may be instantiated in a corresponding table 250. The external tables 210 may not be graphically represented, thereby reducing the modeling effort required to include optional objects 255, 256 in the concise model 201. The optional objects 255, 256 and optional alternative connectors 257, 258 for each prototype may be instantiated in a corresponding table that is external to the model. This representation of the optional alternative entities 255-258 is easier and less time consuming to populate than the graphical such as a SysML graphical representation. The optional alternative entities 255-258 may be represented as rows in the external tables 210. Given a concise model 201, the corresponding external tables 210 schema may be created automatically. The automatically created schema may include a collection of tables, each corresponding to a variation point in the model. The external tables 210 may be stored as a spreadsheet, a database, tabular container and/or another dataset container. The tables 210 may be filled manually or by automatic process, from an existing database, by exporting relevant information from another system such as PDM, from another concise model 201, and/or by an architecture optimization process and/or a combination thereof. For example, when Design Space Exploration (DSE) is applied, some of the tables are left unfilled and represent DSE decision variables. These tables may be completed by the automated process. The concise model 201 structure enables automated design space exploration and generation of optimal designs.

The prototype connectors 220 specify connection points between prototype objects 215, 216. The prototype connectors 220 and/or the prototype objects 215, 216 may have stereotypes 225. As used herein, the term stereotype 225 means an extension mechanism of a modeling language for creating new model elements. The new model elements are derived from existing ones, and have properties suitable for a particular domain challenge which is being modeled. For example, UML stereotypes which are graphically rendered as a name enclosed by guillemets (<< >> and/or << >>) and placed above the name of another element. A stereotype may be used to differentiate between prototype objects and/or prototype connectors. Prototype objects 215, 216 and/or prototype connectors 220 may be optimized separately based on their associated stereotypes 225. A stereotype 225 may have one or more tags 230. For example, the <<typedConnector>> stereotype denotes a prototype connector that represents a concrete physical object, for example a cable, bolt or shaft. This stereotype contains a tag "type" that points to the block that models the physical object. Stereotype tags 230 may also be utilized in the optimization search. Stereotypes 225 may be used to indicate the source of optional objects and/or connectors. For example, importing relevant information from another system may be denoted by applying <<inventory>> on the prototype, and output of the architecture optimization process using <<optimized>>. Another stereotype 225 example is <<catalog>> stereotype. In many cases a component's type may be selected from a predefined catalog and a decision of what actual type to use is part of design exploration and optimization. Such flexibility may be achieved by defining a "prototype" object to be of a type that is marked by the <<catalog>> stereotype. A stereotype 225 may point to a dataset of optional objects. When applied to a table 252 and/or a block in a table, <<catalog>> indicates that the table 252 or block has several variants (subclasses), which are specified in an external table instead of explicitly in the model 205. The table 252 of the "prototype" part thus may have an additional column for type selection, which points to one of the variants in the catalog table. Blocks marked with <<catalog>> may have attributes marked similarly. These stereotype attributes 240 may have different initial values in each variant. These values are specified in the table 252—i.e. each variant may have a row in the table, and each catalog attribute may have a column.

A stereotype 225 may also have stereotype properties 235 that characterize the stereotype 225. For example, the <<optimize>> stereotype may includes the stereotype properties "max" and "min" that may be used to limit a number of the elements in the set. The stereotype properties 235 may be used in the optimization process. A stereotype 225 may also have stereotype attributes 240. The stereotype attributes 240 may also allow their different treatment in the design optimization process. Example of stereotypes 225 and the entities to which they may be applied is listed in the Concise modeling stereotypes table below. Optionally, a schema is generated according to the stereotypes 225 of a model.

| Concise Modeling Stereotypes Table | | |
|---|---|---|
| Stereotype | Applies to | Description |
| «catalog» | Block, attribute | For block: Indicates that variants (sub-classes) of the block are described in external table<br>For attribute: Indicates the attributes that are specified in external catalog table |
| «optimized» | part, attribute, link, allocation | For part/link/allocation: Indicates that the selected set is result of optimization procedure<br>For attribute: Indicates that attribute value is set by optimization procedure |
| «inventory» | part, attribute, link, allocation | For part/link/allocation: Indicates that the used set is indicated in external table<br>For attribute: Indicates that attribute value is set in external table |
| «expand» | part, link, dependency | Indicates what parts should be explicitly display in back-annotation |

After the optimization of a concise model 201, the concise model 201 may go under a model transformation procedure, back annotation 270 to present the selected design(s). The back annotation procedure 270 may result in a graphical representation of the selected elements of the optimization without requiring further effort from the modeler. The <<optimized>> and <<inventory>> elements that should be explicitly shown in the resulting model may be marked. The marking may be performed with a stereotype 225, for example, the <<expand>> stereotype. The back annotation procedure 270 may take as input the populated tables 250-252 and generates an expanded model where all prototypes components 215, 216, 220 marked with <<expand>> are explicitly shown in graphical representation.

Figure 3:
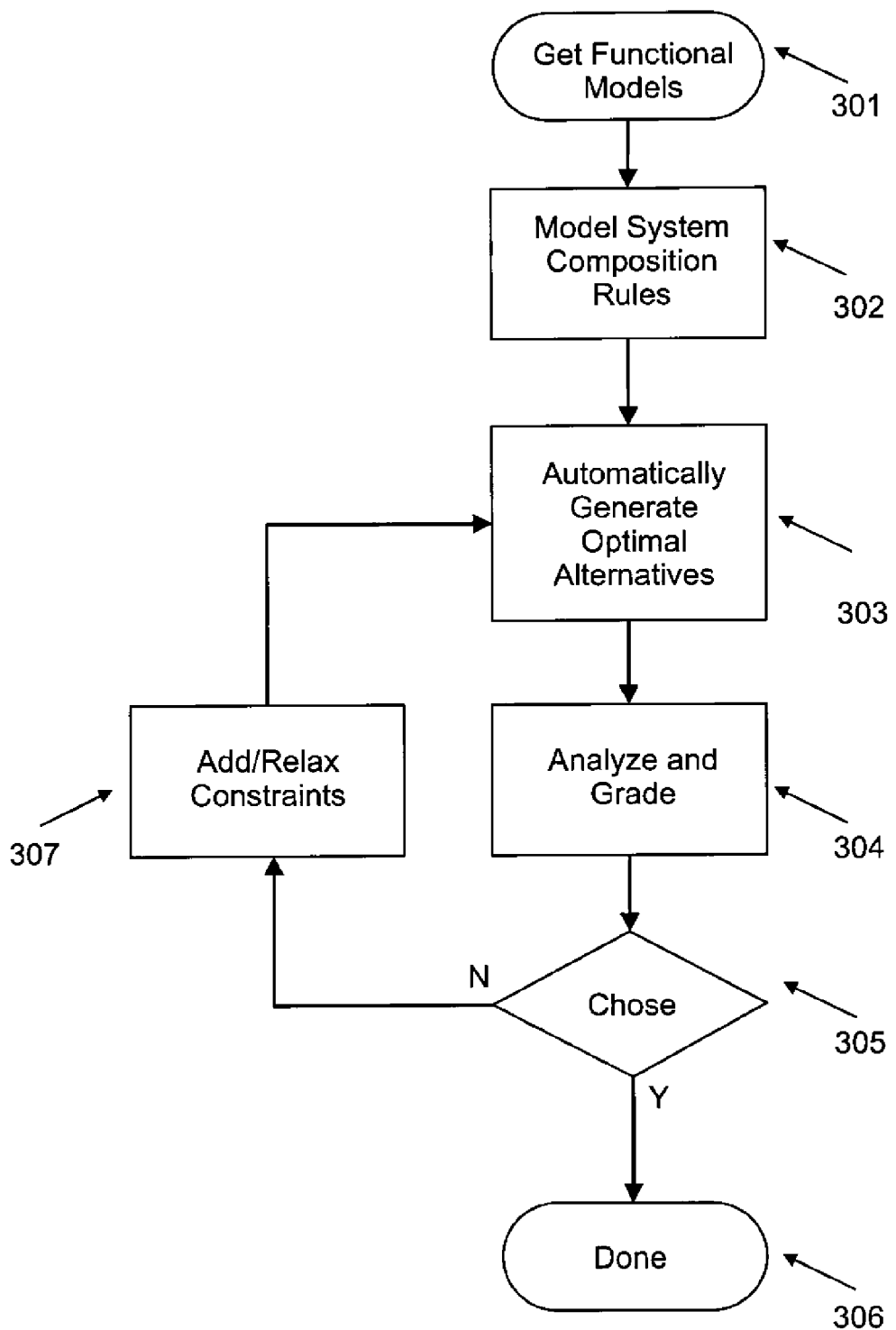
FIG. 3 is an illustration of a method for using concise modeling in the process of designing a system, according to some embodiments of the present invention.

Reference is also made to FIG. 3 which illustrates a method for using concise modeling in the process of designing a system, according to some embodiments of the present invention. This method may be utilized to model design alternatives for trade off studies. This method may support a search for optimal solution. The acceptable practice today is to explicitly model different variants of the system which limit a number of alternative due to high effort required for modeling each of the alternatives. As a result, many alternatives are not evaluated, which results in sub-optimal design solutions. In this method, the input functional model is received 301 and generalized. The generalization may take the form of model system composition rules captured using the concise modeling method described in FIG. 3. The model system composition rules 302 may be defined as prototype objects, prototype connectors and/or constraints over them. Then, optimal alternatives are automatically generated 303. Optionally, techniques for search space reduction may be utilized. Optional alternative designs may be filtered according the constraints. Then, the optimal alternatives are analyzed and graded 304. The analysis and grading 304 may be automatically performed. Alternatives that do not satisfy the requirements will not be chosen 305. Then, the constraints are modified 307 accordingly and the automatic generation of optimal alternatives 303 is repeated. These stages 303-305, 307 may be repeated iteratively until all optimal alternatives are chosen 306.

An example for a typical workflow using this method is:
1. Providing a concise modeling in SysML including:
   catalog classes
   "inventory" parts, attributes, allocation, dependencies
   "optimized" parts, attributes, allocation, dependencies
   constraints
2. Data scheme generation
3. Import of components libraries into catalog tables
4. Populate "inventory" tables (automatically from external tools or manually using supporting GUI)
5. Automatic or manual population of optimized tables. Optionally, the automatic population uses an optimization engine)
6. Back-annotation of resulting the model in SysML
Additional steps such as constraints addition, constraints relaxation and/or solution evaluation may be included.

Figure 4:
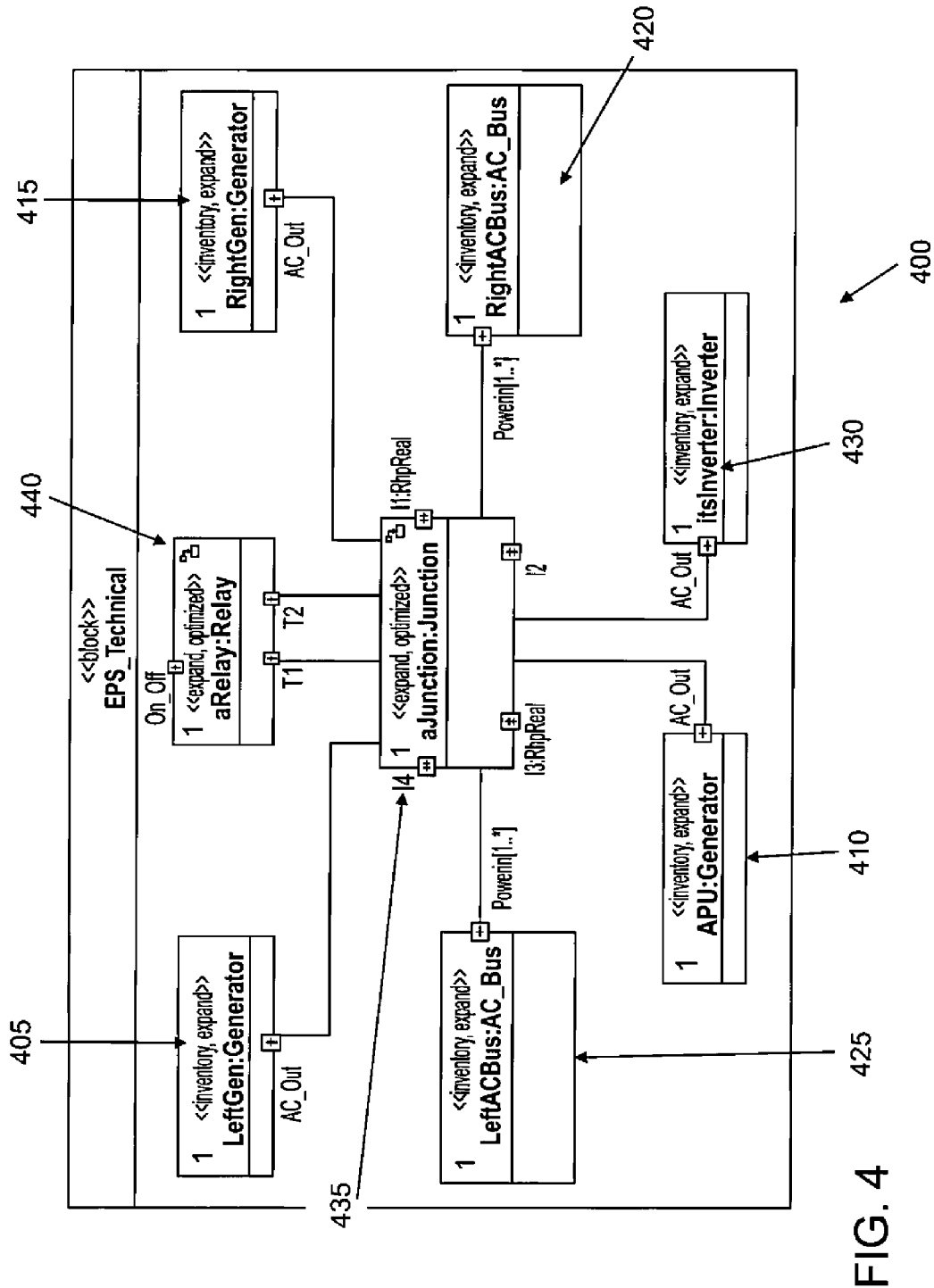
FIG. 4 is an illustration of a concise modeling of the technical layer in Primary Electric Power System (EPS), according to some embodiments of the present invention.

Reference is also made to FIG. 4 which illustrates concise modeling of the technical layer in primary Electric Power System (EPS) 400, according to some embodiments of the present invention. In this example, a typical EPS for aerospace applications is applied on a small vehicle The EPS is split into primary and secondary distribution systems. The primary distribution system includes power generation and ends with the Alternating Current (AC) and Direct Current (DC) buses. The primary EPS is required to satisfy some basic safety requirements. One of its constraints is to make sure that all buses are powered even when some of the power sources have failed. The primary distribution system consists of four power sources: the Right 415 and Left Generators 405, Auxiliary Power Unit (APU) Part 410 and Inverter 430. A relay network 440 connects the sources to the two AC buses 420, 425, which in turn power the DC buses through Transformer Rectifier Units (TRU). The 'aRelay' part 440 marked with optimized, so that an optimal set of the "prototype" components will be found. The external power input and the Ram Air Turbine (RAT), which are normally present in aircraft, are omitted for simplicity. The EPS components 405, Part 410, 415, 420, 425, 430, 435, 440 placement is optimally selected. The input consists of the aircraft geometry, the location of the loads and/or the available spaces where the other components can be installed among other inputs. The following constraints were specified for the primary EPS: Power sources should never be paralleled, all buses 420, 425 must remain powered in case of no more than one failure beyond the Minimum Equipment List (MEL—list of failure combinations that do not affect the mission worthiness of the aircraft) in steady state. One optional objective for an optimization process is minimizing the number of used relays. Another optional objective may be minimizing the overall cabling length of the system.

Figure 5:
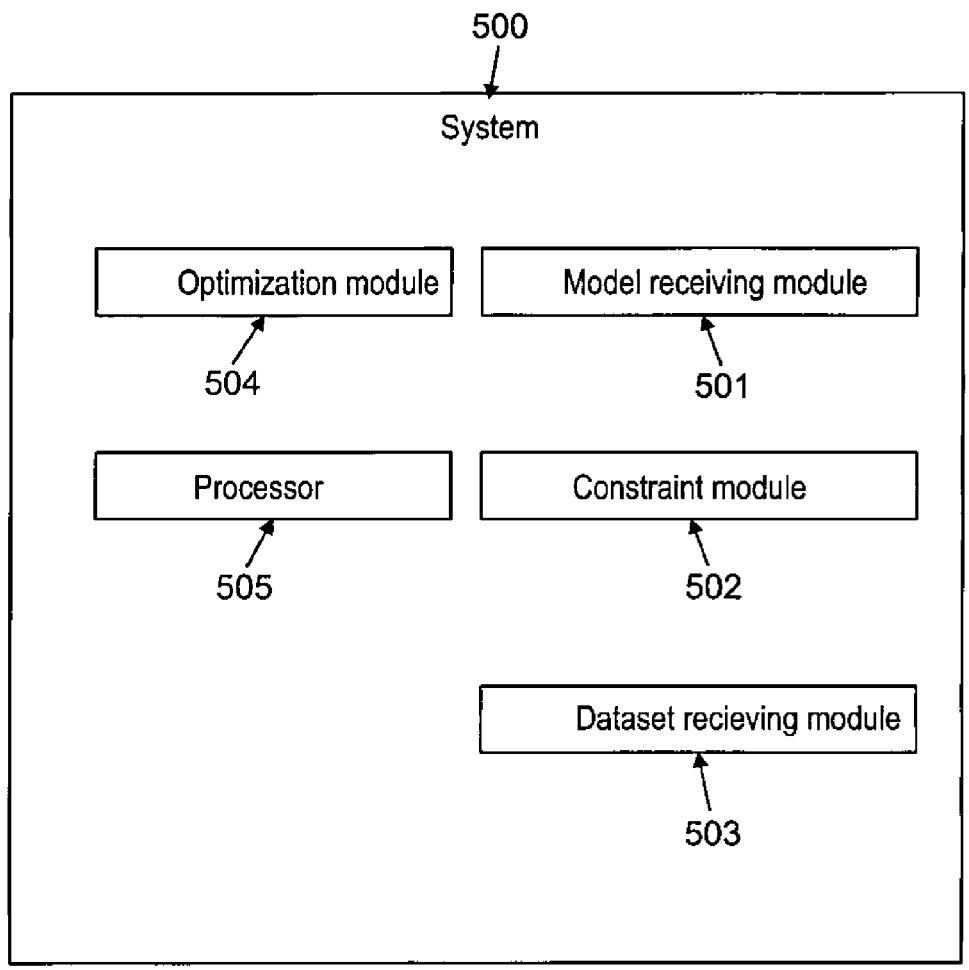
FIG. 5 is an illustration of a system for concise modeling, according to some embodiments of the present invention.

Reference is also made to FIG. 5 which illustrates a system 500 for concise modeling, according to some embodiments of the present invention. The system 500 enables to optimize the design of a system by considering many and/or all possible design alternatives. The system's components are generalized in the form of prototype objects and prototype connectors, as described in FIG. 2. The generic form is modeled with constraints and alternative options for the prototypes are listed. An optimization module 504 outputs optional alternative designs which are in accordance with the system's model. The system 500 has two input modules: a model receiving module 501 and a dataset receiving module 503. The model receiving module 501 receives a model representing prototype objects and/or prototype connectors. The dataset receiving module 503 receives dataset(s) representing optional objects and/or optional alternative connectors. Constraints over the prototype objects and/or the prototype connectors are defined by the constraint module 502. The constraints may be used for reducing the space search of alternative designs used by the optimization module 504. The processor 505 is used by the optimization module 504 to identify optional alternative designs. Each optional alternative design has a set of optional objects and/or optional alternative connectors. The selected optional objects and/or optional alternative connectors are selected from the datasets. The output of the optimization module 504, the optional alternative designs, is in accordance with the model and its constraints. The optimization module 504 may enable to specify generic metrics and/or domain specific metrics for defining the optimization process. The optimization module 504 may be used to define the objective of the optimization process. For example: total weight minimization, minimal cost, smallest part count and/or a combination thereof. The separation between the model receiving module 501 and the dataset receiving module 503 allow graphically modeling of the generic, prototypic portions of the model thereby generating a compact model. Such a compact model is easier to interpret, interact with and less time consuming to build.

Figure 6:
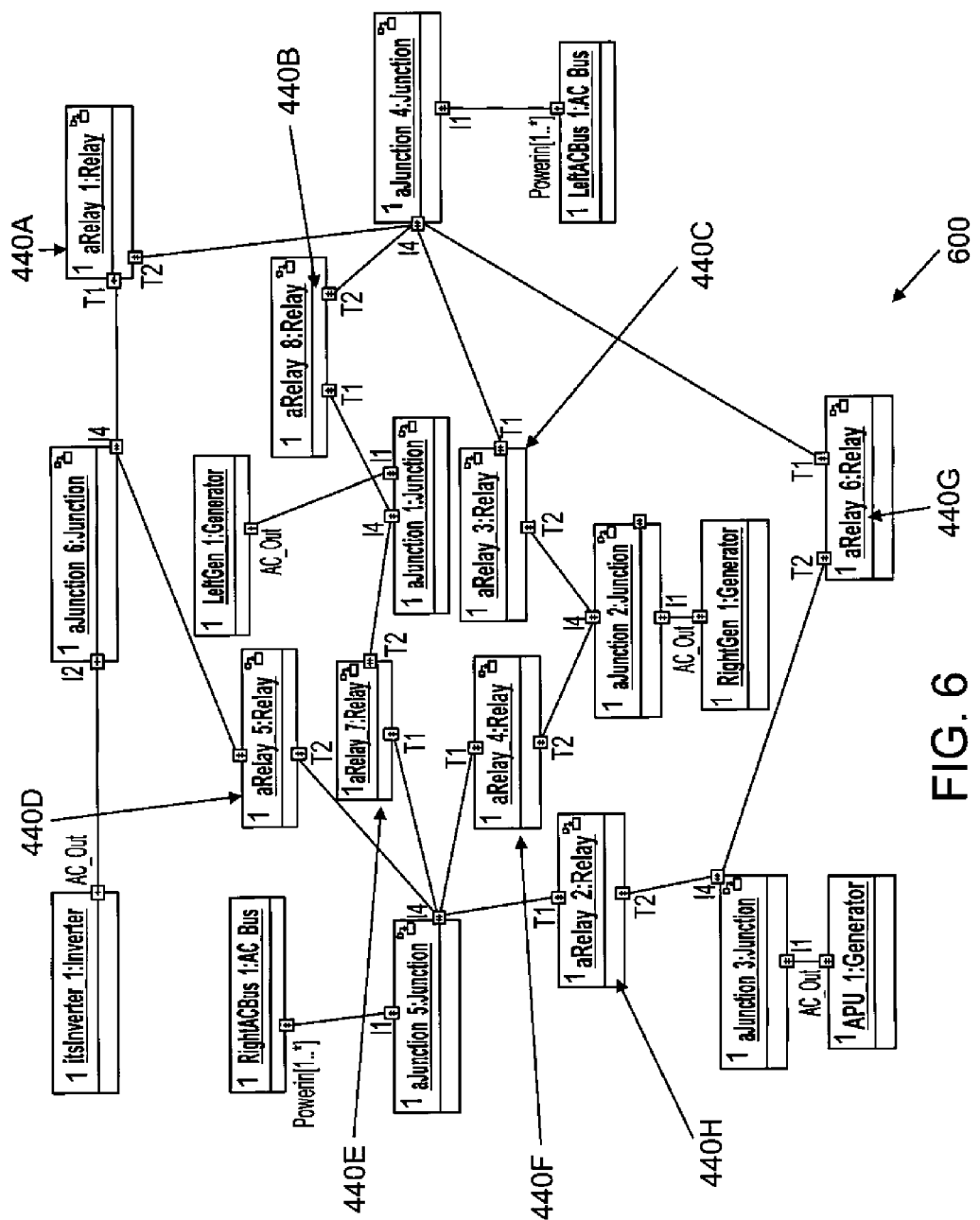
FIG. 6 is an illustration of a back annotated concise model, according to some embodiments of the present invention.

Reference is also made to FIG. 6 which illustrates a back annotated concise model, according to some embodiments of the present invention.

This model 600 is a possible result of back annotation of the model illustrated in FIG. 4. The concise model 205 was merged with the data in the external tables 210 to create this model 600. The data in the external tables 210 has been automatically generated by an optimization process. It should be appreciated by the skilled in the art that the said data may have been received from an external source, manually created or generated by any other automated or manual process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant modeling languages, model representation methods and tabular data representations will be developed and the scopes of the terms model representation methods and tabular data representations are intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "one or more compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for generating an expanded model from a concise model, the method comprising:
  receiving a first concise model mapping a plurality of prototype connections between a plurality of prototype objects,
    wherein each of said prototype objects maps to a plurality of optional objects,
    wherein at least one of said prototype objects includes a directive indicating that said at least one of said prototype objects is replaceable with at least one set of a plurality of said optional objects, said set to be generated during an optimization process, and
    wherein at least another of said prototype objects includes a directive indicating that said at least another of said prototype objects is replaceable with at least one set of a predefined plurality of said optional objects;
  receiving at least one dataset having said plurality of optional objects; and
  automatically constructing a second expanded model having said sets of optional objects in place of said prototype objects.

2. The method of claim 1, wherein said at least one dataset is a table and said table is external to said first concise model.

3. The method of claim 1, wherein said first concise model and said second expanded model are a systems modeling language (SysML) model.

4. The method of claim 1, further comprising:
  generating a graphical representation of said second expanded model.

5. The method of claim 1, further comprising:
  performing said automatically constructing a plurality of times, thereby identifying a plurality of optional alternative designs for a plurality of different versions of said sets.

6. The method of claim 5, further comprising defining a plurality of constraints over said first concise model and restricting said plurality of optional alternative designs to comply with said plurality of constraints.

7. The method of claim 6, further comprising filtering said optional alternative designs according to at least one of said plurality of constraints.

8. The method of claim 7, wherein at least one of said plurality of optional alternative designs further comprises a set of optional alternative connectors from a plurality of optional alternative connectors.

9. The method of claim 6, further comprising:
  identifying at least one of a plurality of constraints having no optional alternative design which complies with said at least one of a plurality of constraints;
  adjusting said at least one of a plurality of constraints;
  identifying a plurality of optional alternative designs each comprising a set of said optional objects selected from said at least one dataset according to said first concise model; and
  iteratively repeating said identifying a plurality of optional alternative designs, said identifying at least one of a plurality of constraints and said adjusting said at least one of a plurality of constraints for creating at least one new said optional alternative design for at least one of said plurality of constraints.

10. The method of claim 6, wherein said constraints define composition rules.

11. The method of claim 5, further comprising receiving at least one dataset having a plurality of optional alternative connections wherein at least one of said plurality of optional alternative connections complies with at least one of said plurality of prototype connections.

12. The method of claim 5, further comprising:
  automatically analyzing said plurality of optional alternative designs; and
  automatically grading said plurality of optional alternative designs.

13. The method of claim 5, wherein at least one of said plurality of prototype objects has at least one stereotype and said at least one stereotype points to said at least one dataset having a plurality of optional objects.

14. The method of claim 13, wherein said at least one dataset in said identifying a plurality of optional alternative designs is pointed by said stereotype.

15. The method of claim 14, wherein said stereotype has a stereotype attribute, a stereotype property and a stereotype tag.

16. The method of claim 15, wherein a process for said identifying a plurality of optional alternative designs is selected according to said stereotype tag and a range, wherein said plurality of optional alternative designs is limited by said stereotype attribute, and wherein a property of said plurality of optional alternative designs is limited by said stereotype property.

17. The method of claim 5, wherein at least one of said plurality of prototype objects has a stereotype and a schema is generated according to said stereotype.

18. The method of claim 5, wherein said at least one dataset is a table and said table is external to said first concise model.

19. The method of claim 5, further comprising:
  identifying at least one of a plurality of constraints having no complying optional alternative design from among said plurality of optional alternative designs; and
  receiving one of said plurality of optional alternative designs for said at least one of a plurality of constraints.

20. The method of claim 5, wherein each of said models is a systems modeling language (SysML) model.

21. The method of claim 5, further comprising:
  back annotation of identified said plurality of optional alternative designs.

22. The method of claim 21, further comprising:
  generating a graphical model representing any of said plurality of optional alternative designs.

23. The method of claim 5, further comprising:
  defining a plurality of constraints over said plurality of prototype connections;
  generating a schema corresponding to said plurality of prototype connections; and
  populating a plurality of tables corresponding to said schema with a plurality of optional alternative connections.

24. A system for generating an expanded model from a concise model, the system comprising:
  a model receiving module which receives a first concise model having a plurality of prototype connections between a plurality of prototype objects,
    wherein each of said prototype objects maps to a plurality of optional objects,
    wherein at least one of said prototype objects includes a directive indicating that said at least one of said prototype objects is replaceable with at least one set of a plurality of said optional objects, said set to be generated during an optimization process, and
wherein at least another of said prototype objects includes a directive indicating that said at least another of said prototype objects is replaceable with at least one set of a predefined plurality of said optional objects;

a dataset receiving module which receives at least one dataset having said plurality of optional objects; and an optimization module configured to automatically construct a second expanded model having said sets of optional objects in place of said prototype objects, wherein said model receiving module, dataset receiving module, and optimization module are implemented in any of
 a) computer hardware and
 b) computer software embodied in a non-transitory, computer-readable storage medium.

25. A computer program product for generating an expanded model from a concise model, the computer program product comprising:

a non-transitory computer-readable medium; and computer-readable program code embodied in the non-transitory computer-readable medium, wherein the computer-readable program code is, when executed by a processor, configured to cause the processor to receive a first concise model mapping a plurality of prototype connections between a plurality of prototype objects,
 wherein each of said prototype objects maps to a plurality of optional objects,
 wherein at least one of said prototype objects includes a directive indicating that said at least one of said prototype objects is replaceable with at least one set of a plurality of said optional objects, said set to be generated during an optimization process, and
 wherein at least another of said prototype objects includes a directive indicating that said at least another of said prototype objects is replaceable with at least one set of a predefined plurality of said optional objects, receive at least one dataset having said plurality of optional objects, and automatically construct a second expanded model having said sets of optional objects in place of said prototype objects.

* * * * *